United States Patent [19]

Hosford

[11] Patent Number: 4,896,507

[45] Date of Patent: Jan. 30, 1990

[54] SOLAR POWER SYSTEM

[75] Inventor: Gregory S. Hosford, Rockford, Ill.

[73] Assignee: Sundstrand Corporation, Rockford, Ill.

[21] Appl. No.: 276,579

[22] Filed: Nov. 28, 1988

[51] Int. Cl.$^4$ .............................................. F03G 7/02
[52] U.S. Cl. ................................... 60/641.8; 60/676; 60/698; 60/721
[58] Field of Search ...................... 10/641.8–641.15, 10/649, 652, 676, 698, 721

[56] References Cited

U.S. PATENT DOCUMENTS

| | | | |
|---|---|---|---|
| 2,706,890 | 4/1955 | Schmidt | 60/649 |
| 3,070,703 | 12/1962 | Podolny | 60/641.8 X |
| 3,101,592 | 8/1963 | Robertson | 60/649 X |
| 4,161,657 | 7/1979 | Shaffer, Jr. | 60/641.8 X |
| 4,167,856 | 9/1979 | Seidel et al. | 60/676 |
| 4,189,922 | 2/1980 | Bellofatto | 60/676 |
| 4,311,011 | 1/1982 | Lewis | 60/641.15 |
| 4,341,607 | 7/1982 | Tison | 204/129 |

Primary Examiner—Allen M. Ostrager
Attorney, Agent, or Firm—Wood, Dalton, Phillips Mason & Rowe

[57] ABSTRACT

A solar power system includes a solar concentrator and a power conversion unit for converting direct solar energy from the concentrator to electrical energy to power appropriate loads. The power conversion unit operates through the medium of a working fluid, such as a turbo-generator. An integrated combustor/heat exchanger is coupled to the power conversion unit for heating the working fluid during periods of solar eclipse and giving off a water combustion product in the form of water vapor. An electrolyzer receives the water combustion product and regenerates the product to gaseous hydrogen and oxygen. The electrolyzer is coupled to the power conversion unit as to be powered thereby during the periods of excess electrical energy. The regenerated hydrogen and oxygen is used in the integrated combustor/heat exchanger during periods of solar eclipse.

16 Claims, 2 Drawing Sheets

SOLAR POWER SYSTEM

FIELD OF THE INVENTION

This invention generally relates to solar power systems and, particularly, to a solar power system which provides immediate energy during direct solar exposure and also provides energy which may be stored for periods of solar eclipse.

BACKGROUND OF THE INVENTION

Various space applications are designed in such a way that the device continuously produces electrical power even when that power is not needed. For example, when a satellite or space station passes through its insolation phase, it is likely to have more solar power available than is required for use. Some solar power systems of this type generally operate turbines at full power levels for purposes of efficiency and, as a result, must "dump" a portion of the electrical power produced.

In order to provide continuously operable systems, phase change materials have been used to act as a storage medium by absorbing heat and melting, followed by a rise in its temperature. When energy is needed, heat is given off by the phase change material as it decreases its temperature, followed by solidification. These systems essentially provide a battery-like device to store energy as the space vehicle orbits the earth and passes through periods of insolation and solar eclipse.

In other systems, such as that shown in U.S. Pat. No. 4,341,607 to Tison, dated July 27, 1982, a photovoltaic array is electrically connected to a voltage-dependent variable resistance load in the form of a water electrolysis unit. This arrangement is used in a solar power system which transfers electrical energy from a solar array to a water electrolysis unit for energy storage and to a DC to AC inverter for immediate consumption while maintaining the photovoltaic array power within a few per cent of its peak power point. Hydrogen from electrolysis is used as a fuel for a hydrogen engine and steam is recirculated to a water reservoir to be reused in the electrolyzer.

The present invention is directed to a new and improved solar power system which utilizes an electrolyzer, but an integrated combustor/heat exchanger is fueled by hydrogen/oxygen from the electrolyzer to heat a working fluid of a motive means which is the same motive means used in the radiant-to-electrical energy converter device.

SUMMARY OF THE INVENTION

An object, therefore, of the invention is to provide a new and improved solar power system which continues to provide power even during periods of solar eclipse.

In the exemplary embodiment of the invention, the solar power system includes a solar concentrator, with power conversion means for converting solar energy from the concentrator to electrical energy to power appropriate loads, through the medium of a working fluid. An integrated combustor/heat exchanger is coupled to the power conversion unit for heating the working fluid during periods of solar eclipse and giving off a water combustion product. An electrolyzer receives the water combustion product and regenerates it to gaseous hydrogen and oxygen. The electrolyzer is coupled to the power conversion means as to be powered thereby during periods of excess electrical energy. Means are provided for supplying the hydrogen and oxygen for combustion in the integrated combustor/heat exchanger during periods of solar eclipse.

In addition, a condenser is provided for receiving the water combustion product from the integrated combustor/heat exchanger and condensing the product to saturated liquid for supply to the electrolyzer. An accumulator is coupled between the condenser and the electrolyzer. The working fluid for the power conversion unit is passed through the condenser for absorbing heat from condensation of the water combustion product. The working fluid first is passed through the condenser and then through the integrated combustor/heat exchanger for absorbing heat of the hydrogen/oxygen combustion. Means also are provided for storing the hydrogen and oxygen from the electrolyzer during periods of excess electrical energy for supply to the integrated combustor/heat exchanger during periods of solar eclipse.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
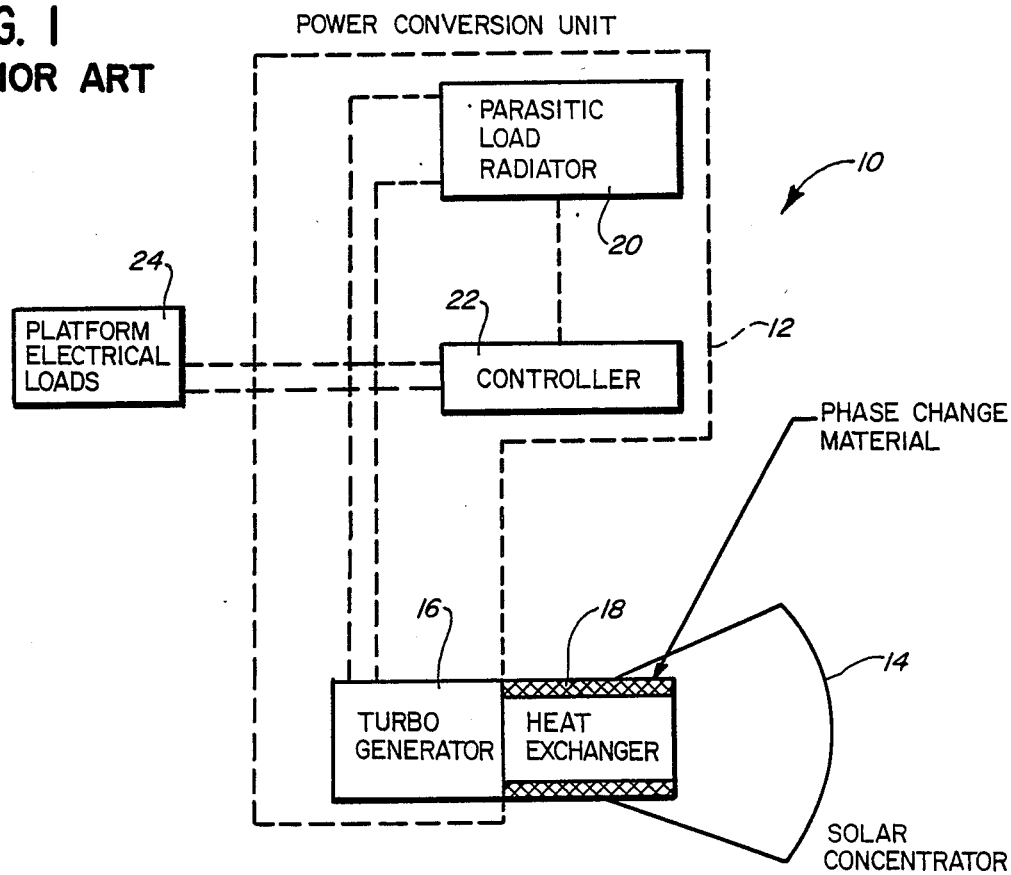
FIG. 1 is a schematic illustration representing a solar power system of the prior art.

Referring to the drawings in greater detail, and first to FIG. 1, a block diagram of a typical solar dynamic power system of the prior art is illustrated and generally designated 10. The components within dotted line 12 form a power conversion unit. In a conventional solar dynamic power system, a solar concentrator 14, such as a segmented parabolic mirror, concentrates solar energy to drive a turbo-generator 16, heating the turbine working fluid through a heat exchanger 18. The system stores some of the heat from concentrator 14 as heat of fusion by melting a phase change material (PCM) within the heat exchanger. Lithium fluoride is an example of a phase change material. The PCM later releases this heat of fusion providing energy to drive turbo-generator 16 during periods of solar eclipse. In order to maximize turbine efficiency and eliminate generator output power fluctuations as the power requirements of a space platform, for instance, change, the turbo-generator operates continuously at its rated output power. The system "dumps" its excess electrical power to space through an electrical resistor bank that is thermally connected to radiators 20. The energy from turbo-generator 16 is channeled through a controller 22 to the platform electrical loads 24.

Figure 2:
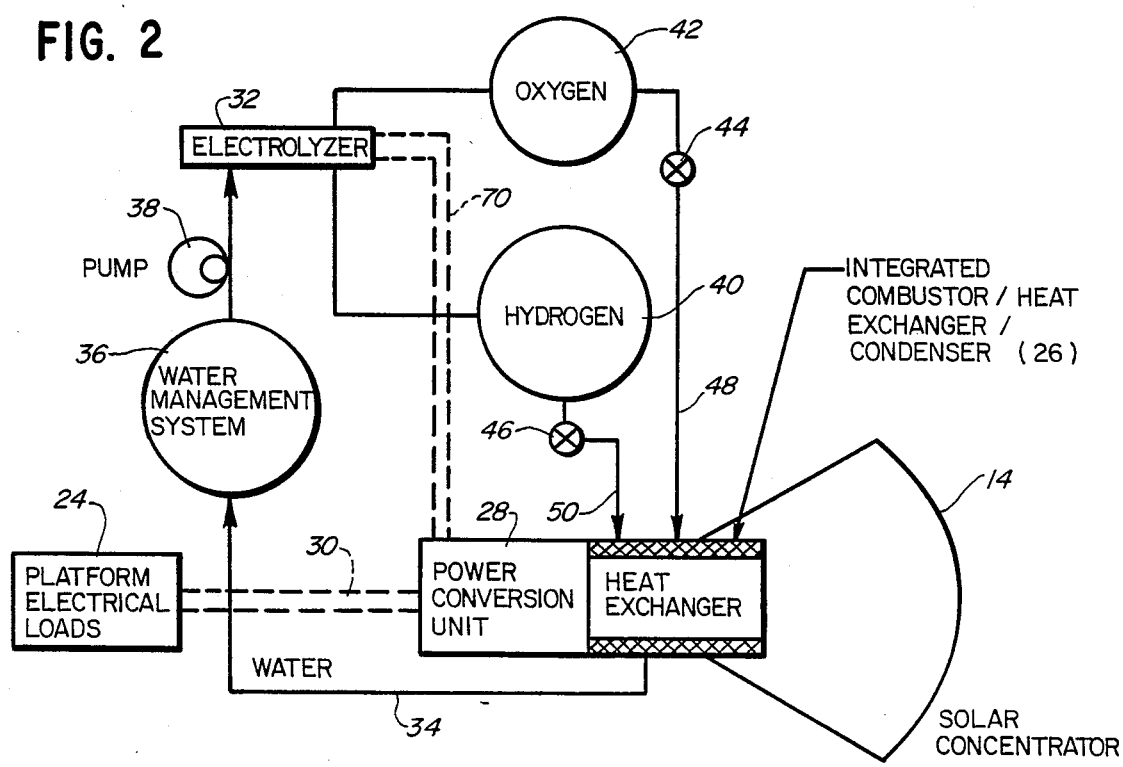
FIG. 2 is a schematic illustration representing the solar power system of the invention.

FIG. 2 shows, in block diagram form, the chemical energy source portion of the invention which provides heat energy for the solar dynamic power system during periods of eclipse. The system incorporates a condenser (described in relation to FIG. 3) and an integrated combustor/heat exchanger, all located in the block designated 26 coupled to solar concentrator 14. A power conversion unit 28 is coupled to solar concentrator 14, for converting solar energy from the solar concentrator to electrical energy to power appropriate loads 24, as at 30. The power conversion unit operates through a medium of a working fluid, such as with a turbine.

However, some of the electrical energy from power conversion unit 28 is supplied to an electrolyzer 32.

As will be described in greater detail hereinafter, water from integrated combustor/heat exchanger/condenser 26 is channeled, as at 34, to a water management system 36 which may include accumulator means. Water from the water management system is supplied to electrolyzer 32 by an appropriate pump means 38.

Electrolyzer 32 regenerates the water to gaseous hydrogen and oxygen which can be stored, as in storage tanks 40 and 42, respectively. These components of combustion then can be controlled, as by the use of valves 44 and 46, for supplying the components to integrated combustor/heat exchanger/condenser 26, as indicated by lines 48 and 50, respectively, for purposes of combustion. The water combustion product then is recirculated, as at 34, back through the closed system as described above.

Figure 3:
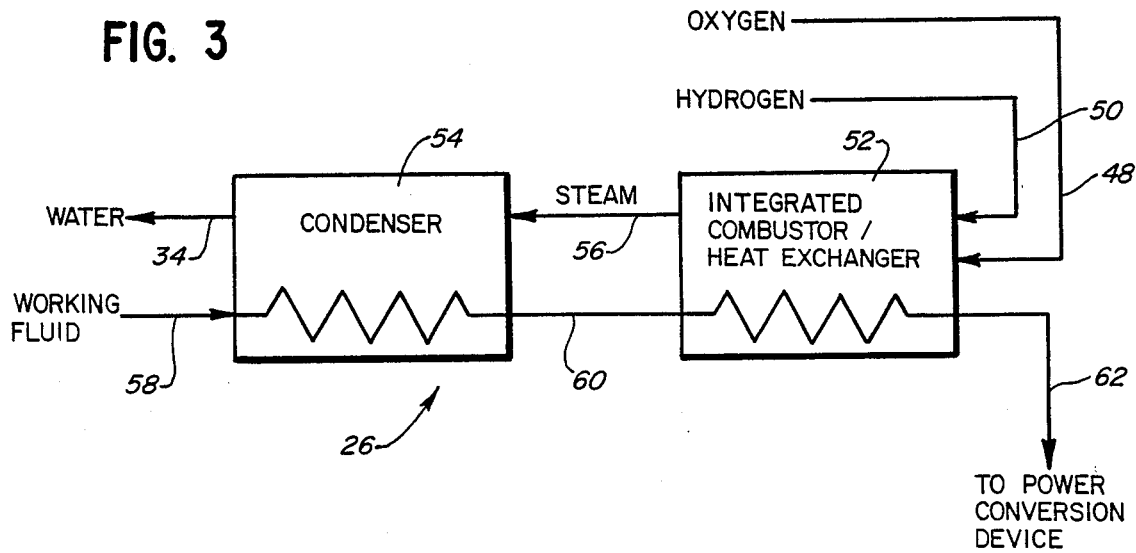
FIG. 3 is a schematic illustration of the "heat exchanger" block shown in FIG. 2.

FIG. 3 shows in greater detail the integrated combustor/heat exchanger/condenser represented by block 26 in FIG. 2. More particularly, an integrated combustor/heat exchanger 52 is shown in block form, along with a condenser 54. Lines 48 and 50 are shown for supplying oxygen and hydrogen, respectively, from storage tanks 42 and 40 (FIG. 2). As a result of combustion, a steam combustion product leaves the combustor, as at 56, and enters condenser 54 where it leaves as water to be channeled by line 34 to water management system 36 (FIG. 2). In a reverse direction, working fluid from power conversion unit 28 enters condenser 54, as at 58, where the working fluid absorbs both the sensible heat and the latent heat of vaporization from the water combustion product exiting integrated combustor/heat exchanger 52. After leaving the condenser, the working fluid flows, as at 60, through the heat exchanger portion (described hereinafter) of integrated combustor/heat exchanger 52 where it absorbs the heat of hydrogen/oxygen combustion. The working fluid then flows, as at 62, to energy conversion unit 28, such as a turbo-generator to produce useful work in the form of shaft or electrical power.

Figure 4:
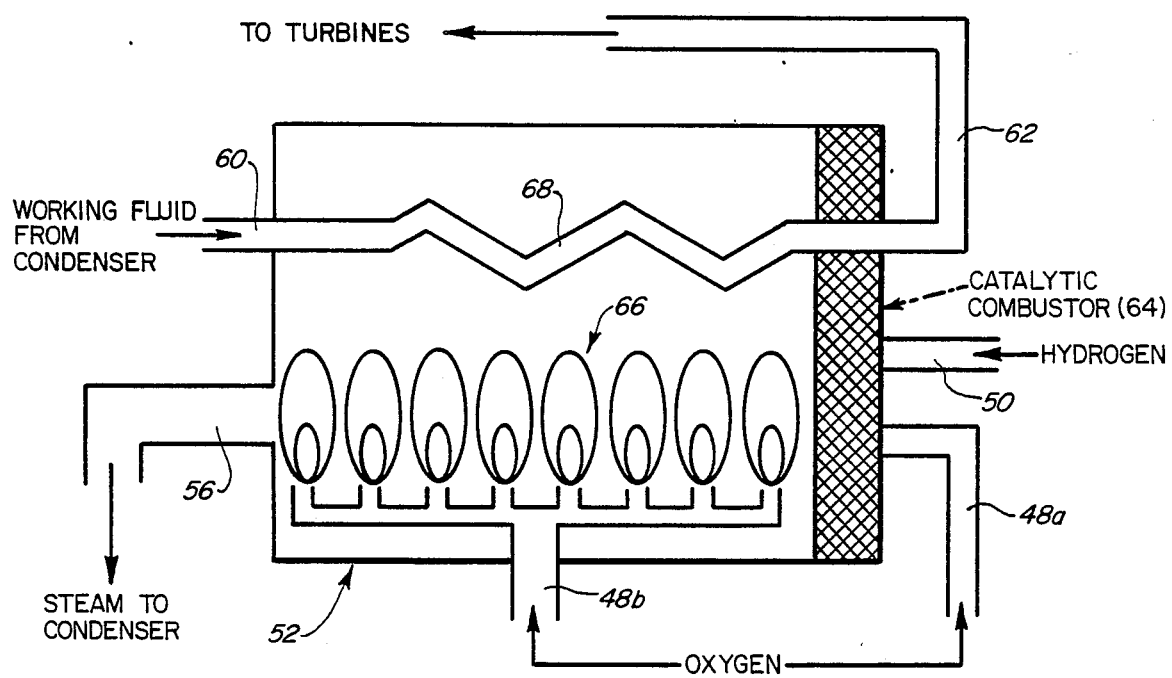
FIG. 4 is a schematic illustration of the integrated combustor/heat exchanger shown in the right portion of FIG. 3.

FIG. 4 shows in greater detail the integrated combustor/heat exchanger 52 illustrated in FIG. 3. As described above, hydrogen enters the device through line 50 and steam leaves the device through line 56 to condenser 54 (FIG. 3). Working fluid enters the device from the condenser 54 through line 60 and is directed to the power conversion unit 28 through line 62. The oxygen from line 48 (FIG. 2) is split, as at 48a and 48b, upon entering the device. A catalytic combustor 64 preheats the hydrogen fuel to the operating temperature of the integrated combustor/heat exchanger 52, well above the hydrogen/oxygen autoignition temperature. The hydrogen is combusted, as at 66. The hydrogen/water vapor mixture in the combustor continuously rejects heat to the working fluid, as at 68. As heat is rejected to the working fluid, oxygen is injected into the combustor providing heat energy to keep the hydrogen/water vapor mixture at the combustor operating temperature. Appropriate controls (not shown) operate valves 44, 46 (FIG. 2) so that the mass flow rate of oxygen and hydrogen in the combustor is controlled in order that all of the hydrogen fuel and the oxygen are consumed in the combustor and only pure water vapor exits the combustor to the condenser. In the condenser, the steam rejects its remaining sensible heat and latent heat of vaporization to the low temperature working fluid. The saturated liquid then flows to water management system 36, as described above.

Summarizing the operation, the invention can be used in various solar dynamic power load leveling applications. During periods when direct solar energy drives the turbo-generator or power conversion unit, some of the electrical power from the turbo-generator is channeled to electrolyzer 32 as indicated by dotted lines 70 (FIG. 2) whereby the water from management system 36 is electrolyzed into hydrogen and oxygen for storage in tanks 40 and 42, respectively. During a period of solar eclipse, the hydrogen and oxygen flows to the integrated combustor/heat exchanger/condenser 26 in concentrator 14 where the combustor and condenser heat the turbine working fluid to drive the turbo-generator. Water from the condenser recirculates to the electrolyzer where it is regenerated during insolation and stored as gaseous hydrogen and oxygen for the next period of eclipse. The heat energy released in producing approximately 10 kg of water provides enough energy to drive a 25 kwe power conversion unit with a thermal efficiency of 33% for 34 minutes.

With the invention, instead of dumping excess electrical power to space through a resistor bank, excess electrical power goes to the electrolyzer to liberate hydrogen and oxygen for use during eclipse. Even if a resistor bank still is necessary, the system greatly reduces the size of the resistor bank and its associated radiator. The system significantly reduces the weight of energy storage apparatus since the specific energy of the hydrogen/oxygen chemical reaction is approximately sixteen times that of unencapsulated lithium fluoride which is used as a phase change material in certain prior art systems, such as that shown in FIG. 1.

The invention is advantageous in that its load leveling integrates well with a hydrogen/oxygen reaction control system thruster jet concept, requiring only a small increase in electrolyzer and reactant tankage size and weight. The weight of the integrated combustor/heat exchanger, condenser, reactant/water lines and increased electrolyzer and reactant tankage is significantly less than that of the encapsulated phase change material and its associated hardware.

In comparison to other electrolysis systems, with the invention, the working fluid is used to condense the steam emanating from the combustor where the hydrogen and oxygen are combined. Therefore, the oxygen and hydrogen and the resulting combustion product (i.e., steam) are used in dual roles to raise the temperature of the working fluid, namely: they are combined in the combustor and, after forming steam, the steam is condensed by thermal communication with the working fluid. In addition, the invention utilizes only one power conversion unit, such as a turbo-generator, which is driven alternatively by direct solar energy or by the combination of hydrogen and oxygen. Furthermore, hydrogen in the subject invention is not used as a working fluid and the hydrogen/oxygen combustion products are not directly used to drive some load.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A solar power system, comprising:
    solar concentrator means;
    power conversion means for converting solar energy from the solar concentrator means to electrical energy, through the medium of a working fluid, to power appropriate loads;
    integrated combustor/heat exchanger means coupled to the power conversion means for heating said working fluid during periods of solar eclipse and giving off a water combustion product;
    electrolyzer means for receiving the water combustion product from the integrated combustor/heat exchanger means and regenerating the water combustion product to gaseous hydrogen and oxygen, the electrolyzer means being coupled to the power conversion means as to be powered thereby during periods of excess electrical energy; and
    means for supplying the hydrogen and oxygen for combustion in the integrated combustor/heat exchanger during said periods of solar eclipse.

2. The solar power system of claim 1, including condenser means for receiving the water combustion product from the integrated combustor/heat exchanger means and condensing the product to saturated liquid for supply to the electrolyzer means.

3. The solar power system of claim 2, including water accumulator means coupled between the condenser means and the electrolyzer means.

4. The solar power system of claim 2, including means for passing said working fluid through the condenser means for absorbing heat from condensation of the water combustion product.

5. The solar power system of claim 4, including means for passing said working fluid first through the condenser means and then through the integrated combustor/heat exchanger means for absorbing heat of the hydrogen/oxygen combustion.

6. The solar power system of claim 1, including means for storing the hydrogen and oxygen from the electrolyzer means during periods of direct solar energy for supply to the integrated combustor/heat exchanger means during periods of solar eclipse.

7. A solar power system, comprising:
    solar concentrator means;
    power conversion means for converting solar energy from the solar concentrator means to electrical energy, through the medium of a working fluid, to power appropriate loads;
    integrated combustor/heat exchanger means coupled to the power conversion means for heating said working fluid during periods of solar eclipse and giving off a water combustion product;
    condenser means for receiving the water combustion product from the integrated combustor/heat exchanger means and condensing the product to saturated liquid for supply to the electrolyzer means;
    electrolyzer means for receiving the water combustion product from the condenser means and regenerating the water combustion product to gaseous hydrogen and oxygen, the electrolyzer means being coupled to the power conversion means as to be powered thereby during periods of excess electrical energy; and
    means for storing the hydrogen and oxygen from the electrolyzer means during periods of direct solar energy for supply to the integrated combustor/heat exchanger means during periods of solar eclipse.

8. The solar power system of claim 7, including water accumulator means coupled between the condenser means and the electrolyzer means.

9. The solar power system of claim 7, including means for passing said working fluid through the condenser means for absorbing heat from condensation of the water combustion product.

10. The solar power system of claim 9, including means for passing said working fluid first through the condenser means and then through the integrated combustor/heat exchanger means for absorbing heat of the hydrogen/oxygen combustion.

11. A solar power system, comprising:
    working fluid power conversion means for converting solar energy to power an appropriate load during periods of direct solar energy;
    integrated combustor/heat exchanger means for combusting hydrogen and oxygen to heat the working fluid during periods of solar eclipse, and producing a water product of combustion;
    electrolyzer means for regenerating the water combustion product to gaseous hydrogen and oxygen for combustion in the integrated combustor/heat exchanger means; and
    means for coupling the electrolyzer means to the power conversion means as to be powered thereby during the periods of excess electrical energy.

12. The solar power system of claim 11, including condenser means for receiving the water combustion product from the integrated combustor/heat exchanger means and condensing the combustion product to saturated liquid for supply to the electrolyzer means.

13. The solar power system of claim 12, including water accumulator means coupled between the condenser means and the electrolyzer means.

14. The solar power system of claim 12, including means for passing said working fluid through the condenser means for absorbing heat from condensation of the water combustion product.

15. The solar power system of claim 14, including means for passing said working fluid first through the condenser means and then through the integrated combustor/heat exchanger means for absorbing heat of the hydrogen/oxygen combustion.

16. The solar power system of claim 11, including means for storing the hydrogen and oxygen from the electrolyzer means during periods of direct solar energy for supply to the integrated combustor/heat exchanger means during periods of solar eclipse.

* * * * *